(12) United States Patent
Stephenson et al.

(10) Patent No.: US 6,690,436 B2
(45) Date of Patent: Feb. 10, 2004

(54) LIGHT-MODULATING, ELECTRICALLY RESPONSIVE PRIVACY SCREEN

(75) Inventors: Stanley W. Stephenson, Spencerport, NY (US); John W. Boettcher, Webster, NY (US); David J. Giacherio, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/347,390

(22) Filed: Jan. 21, 2003

(65) Prior Publication Data

US 2003/0133057 A1 Jul. 17, 2003

Related U.S. Application Data

(63) Continuation of application No. 09/478,487, filed on Jan. 6, 2000, now Pat. No. 6,552,762.

(51) Int. Cl.[7] ............................................. G02F 1/1333
(52) U.S. Cl. ..................... 349/86; 349/89; 349/183; 359/253
(58) Field of Search ........................... 349/86, 89, 92, 349/93, 183, 185; 359/252, 253

(56) References Cited

U.S. PATENT DOCUMENTS

| | | |
|---|---|---|
| 4,433,378 A | 2/1984 | Leger |
| 4,894,847 A | 1/1990 | Tjahjadi et al. |
| 4,951,278 A | 8/1990 | Biber et al. |
| 4,985,891 A | 1/1991 | Fujiwara et al. |
| 5,012,470 A | 4/1991 | Shobu et al. |
| 5,276,425 A | 1/1994 | Swanson et al. |
| 5,283,638 A | 2/1994 | Engberg et al. |
| 5,375,121 A | 12/1994 | Nishino et al. |
| 5,594,732 A | 1/1997 | Bell et al. |
| 5,867,238 A * | 2/1999 | Miller et al. ................ 349/92 |
| 5,898,674 A | 4/1999 | Mawhinney et al. |
| 6,271,898 B1 * | 8/2001 | Clikeman et al. ............ 349/86 |
| 6,300,932 B1 * | 10/2001 | Albert ....................... 345/107 |

* cited by examiner

Primary Examiner—Robert H. Kim
Assistant Examiner—David Y. Chung
(74) Attorney, Agent, or Firm—Raymond L. Owens

(57) ABSTRACT

A light-modulating, electrically responsive privacy screen includes a transparent substrate and an electrically conductive layer formed over the substrate. The privacy screen further includes a light-modulating layer disposed over the electrically conductive layer and including at least one dispersable light-modulating material and coalescence limiting material into which the dispersible light-modulating material(s) is provided so that such dispersible light-modulating material coalesces to form a set domains having at least two optical states, the first optical state being present in the absence of an electrical field and the second being caused by the application of an electrical field and wherein one of the optical states cause the light-modulating layer to be transparent and the other optical state causes the light-modulating layer to restrict a user viewing through the privacy screen and thereby provide an appropriate level of privacy.

12 Claims, 4 Drawing Sheets

LIGHT-MODULATING, ELECTRICALLY RESPONSIVE PRIVACY SCREEN

CROSS REFERENCE TO RELATED APPLICATIONS

This application is a continuation of U.S. patent application Ser. No. 09/478,487, entitled "A Light Modulating, Electrically Responsive Privacy Screen", and filed Jan. 6, 2000 now U.S. Pat. No. 6,552,762, the disclosure of which is incorporated herein by reference in its entirety.

Reference is made to commonly assigned U.S. Pat. Nos. 6,010,839; 6,394,870; and 6,423,368; and to commonly assigned U.S. patent application Ser. No. 09/478,963 filed Jan. 6, 2000; the disclosures of which are incorporated herein by reference in their entireties.

FIELD OF THE INVENTION

The present invention relates to coatable privacy screens having light-modulating material which can be used as privacy screens.

BACKGROUND OF THE INVENTION

Currently, information is displayed on privacy screens using permanent inks or displayed on electronically modulated surfaces such as cathode ray displays or liquid crystal displays. Other privacy screen materials can carry magnetically writable areas to carry ticketing or financial information, however magnetically written data is not visible.

World patent application PCT/WO 97/04398, entitled "Electronic Book With Multiple Display Pages", is a thorough recitation of the art of thin, electronically written privacy screen display technologies. Disclosed is the assembling of multiple display privacy screens that are bound into a "book", each privacy screen provided with means to individually address each page. The patent recites prior art in forming thin, electronically written pages, including flexible privacy screens, image modulating material formed from a bi-stable liquid crystal system, and thin metallic conductor lines on each page.

Heretofore, U.S. Pat. No. 3,697,297, discloses material suitable for such a device. A cholesteric liquid crystal material is encapsulated by light penetrable gelatin and gum arabic capsules that are coated on a screen. The screen changes color when receiving sufficient heat energy to clear the cholesteric material.

Fabrication of flexible, electronically written display privacy screens using liquid crystals materials was disclosed in U.S. Pat. No. 4,435,047. A first privacy screen has transparent ITO conductive areas and a second privacy screen has electrically conductive inks printed on display areas. The privacy screens can be thin glass, but preferably have been formed of Mylar polyester. A dispersion of liquid crystal material in a binder is coated on the first privacy screen, and the second privacy screen is bonded to the liquid crystal material. Electrical potential is applied to opposing conductive areas to operate on the liquid crystal material and expose display areas. The display uses nematic liquid crystal materials, which ceases to present an image when de-energized. Currently, privacy screens, also known as privacy windows, are created using the scattering properties of conventional nematic liquid crystals. Such materials require continuous electrical drive to remain transparent.

U.S. Pat. No. 5,437,811 discloses a light-modulating cell having a polymerically dispersed chiral nematic liquid crystal. The chiral nematic liquid crystal has the property of being driven between a planar state reflecting a specific visible wavelength of light and a light scattering focal-conic state. Said structure has the capacity of maintaining one of the given states in the absence of an electric field.

The prior art discloses methods for forming polymer beads from polymeric precursors in aqueous suspension such as, U.S. Pat. No. 2,932,629. U.S. Pat. No. 2,932,629 disclose a limited coalescent method for forming spheroid particles of highly uniform size through the use of colloidal particles to limit coalescence of smaller droplets into larger, uniform domains. The polymerizable liquid is brought to given size, and a catalytic agent performs the polymerization reaction to form solid polymeric bodies having substantially uniform size. The technique of using limited coalescence for uniform bead size during polymerization is further disclosed in U.S. Pat. Nos. 3,933,771, 4,324,932, and 4,833,060.

SUMMARY OF THE INVENTION

Accordingly, it is an object of the present invention to provide a privacy screen having a machine coatable polymerically dispersed-light-modulating material of uniform domain size.

Another object of the present invention is to disperse liquid crystal material using limited coalesence and coat the dispersion to form a dispersed light-modulating layer having improved optical properties which are used in privacy screens.

The present invention uses a colloidal solid particle emulsifier to limit domain growth from a highly dispersed state. Uniformly sized liquid crystal domains are created and machine coated to manufacture light-modulating, electrically responsive privacy screens with improved optical efficiency. The privacy screen can be formed using inexpensive, efficient photographic layer methods. A single large area of privacy screen material can be coated and formed into various types of privacy screens and cards. Privacy screens in accordance with the present invention are inexpensive, simple and fabricated using low-cost processes.

These objects are achieved by a light-modulating, electrically responsive privacy screen comprising:

(a) a transparent substrate;

(b) an electrically conductive layer formed over the substrate;

(c) a light-modulating layer disposed over the electrically conductive layer and including at least one dispersible light-modulating material and coalescence limiting material into which the dispersible light-modulating material(s) is provided so that such dispersible light-modulating material coalesces to form a set domains having at least two optical states, the first optical state being present in the absence of an electrical field and the second being caused by the application of an electrical field and wherein one of the optical states cause the light-modulating layer to be transparent and the other optical state causes the light-modulating layer to restrict a user viewing through the privacy screen and thereby provide an appropriate level of privacy.

Flexible privacy screens can efficiently be made in accordance with the present invention which has a light-modulating layer which has domains with improved optical properties. By changing the field applied across the layer, information can be written in the privacy screen.

DETAILED DESCRIPTION OF THE PREFERRED EMBODIMENT

Figure 1A:
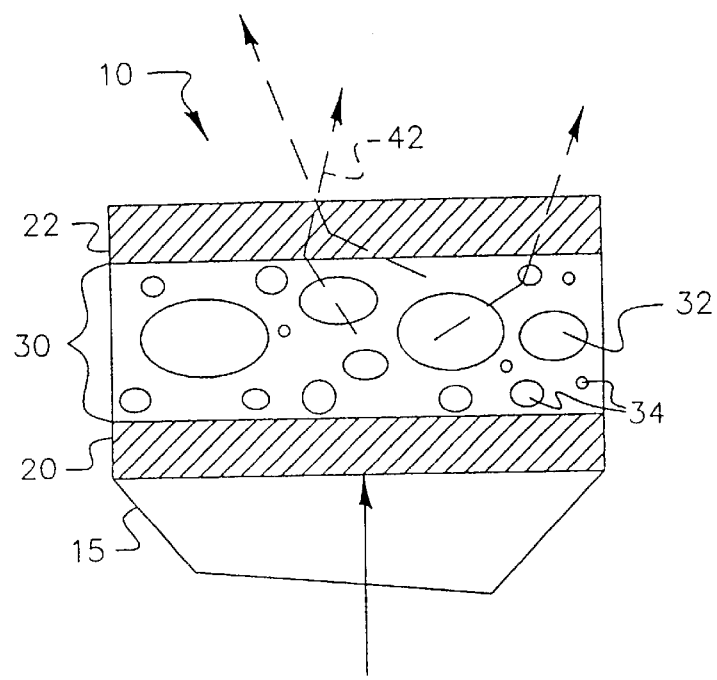
FIG. 1A is a sectional view of a prior art privacy screen having a layer of polymer dispersed liquid crystal material using current dispersion methods.

FIG. 1A is a sectional view of a portion of a privacy screen 10 in the form of a privacy screen supporting a conventional polymer dispersed light-modulating material. The privacy screen 100 includes a substrate 15. Substrate 15 can be made of a polymeric material, such as Kodak Estar film base formed of polyester plastic, and have a thickness of between 20 and 200 microns. For example, substrate 15 can be a 80 micron thick privacy screen of transparent polyester. Other polymers, such as transparent polycarbonate, can also be used. Alternatively, substrate 15 can be thin, transparent glass.

A first conductor 20 is formed over substrate 15. First conductor 20 can be a transparent, electrically conductive layer of tin-oxide or indium-tin-oxide (ITO), with ITO being the preferred material. Typically, first conductor 20 is sputtered onto the substrate 15 to a resistance of less than 250 ohms per square. Alternatively, first conductor 20 can be an opaque electrical conductor formed of metal such as copper, aluminum or nickel. If first conductor 20 is an opaque metal, the metal can be a metal oxide to create a light absorbing first conductor 20.

A light-modulating layer 30 is deposited over first conductor 20. Light-modulating layer 30 can contain a nematic liquid crystal of conventional design. The selected material should exhibit high optical and electrical anisotropy and match the index of refraction of the carrier polymer when the material is electrically oriented. Examples of such materials are Merck BL-03, BL-048 or BL-033 which are available from EM Industries of Hawthorne, N.Y. Other light reflecting or diffusing modulating, electrically operated materials can also be coated such as a micro-encapsulated electrophoretic material in oil.

In one embodiment, a liquid crystal material is dispersed water containing a water-soluble binder material such as de-ionized gelatin, polyvinyl alcohol (PVA) or polyethylene oxide (PEO). Such compounds are machine coatable on equipment associated with photographic films. It is important that the binder have a low ionic content. The presence of ions in such a binder hinders the development of an electrical field across the dispersed liquid crystal material. Additionally, ions in the binder can migrate in the presence of an electrical field, chemically damaging the light-modulating layer 30. The liquid crystal and gelatin emulsion is coated to a thickness of between 5 and 30 microns to optimize optical properties of light-modulating layer 30. The coating thickness, size of the liquid crystal domains, and concentration of the domains of liquid crystal materials are designed for optimum optical properties. Heretofore, the dispersion of liquid crystals is performed using shear mills or other mechanical separating means to form domains 32 of liquid crystal within light-modulating layer 30.

A second conductor 22 is applied to the surface of light-modulating layer 30. Second conductor 22 should have sufficient conductivity to carry a field across light-modulating layer 30. Second conductor 22 can be formed in a vacuum environment using materials such as aluminum, tin, silver, platinum, carbon, tungsten, molybdenum, or indium. Oxides of said metals can be used to darken patternable conductive layer 14. The metal material can be excited by energy from resistance heating, cathodic arc, electron beam, sputtering or magnetron excitation. Use of tin-oxide-or indium-tin-oxide in the coating permit second conductor 22 to be transparent. Alternatively, second conductor 22 can be printed conductive ink such as Electrodag 423SS screen printable electrical conductive material from Acheson Corporation. Such printed materials are finely divided graphite particles in a thermoplastic resin.

In a series of experiments, EM Industries nematic liquid crystal material BL-048 was dispersed in deionized photographic gelatin by standard dispersion methods. By varying the formulation, homogenization devices (sonification and rotor-stator mixer) create emulsions of different droplet size. Light microscopy showed all emulsions to have a broad distribution in droplet size, having domain size varying in diameter by a ratio of 10:1. Dispersions were made having mean sizes of approximately 1, 3, 5, and 9 micron diameter. The materials were coated onto privacy screens of ITO coated polyester having a privacy screen conductivity of 160 ohms per square. The coating was dried to provide a 9-micron thick polymerically dispersed liquid crystal coating.

Figure 1B:
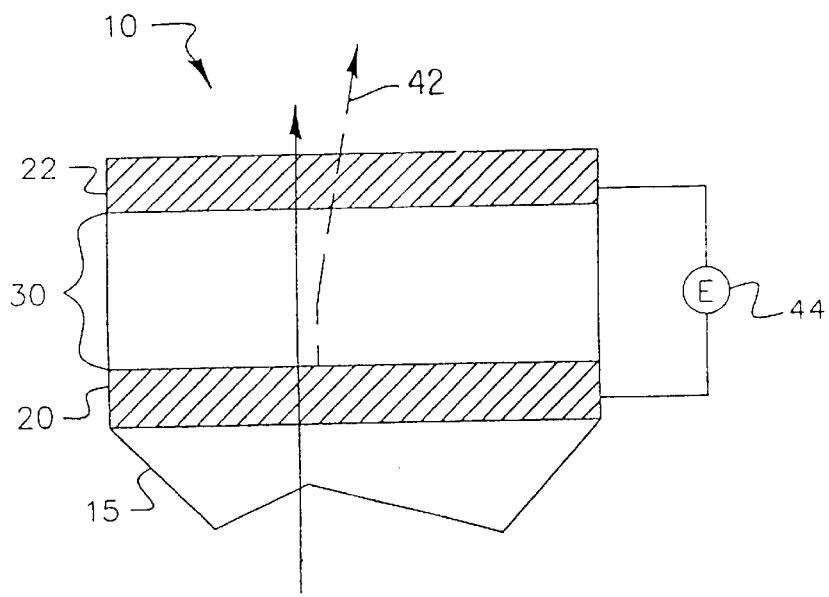
FIG. 1B is a sectional view of the privacy screen of FIG. 1A with an applied electrical field.

In FIG. 1B, the coated privacy screen 10 using the conventional dispersion means discussed above were bonded to a second privacy screen of ITO coated plastic to provide a clear top conductor second 22. An electric field 44 was applied to align the liquid crystal material in light-modulating layer 30. The domains aligned and privacy screen 10 became transparent with a minimum of scattering light 42. When electric field 44 was removed, privacy screens 10 returned to a translucent state. Selective translucence of privacy screen 10 is useful in making privacy screens and displays, as set forth in the prior art.

Figure 3:
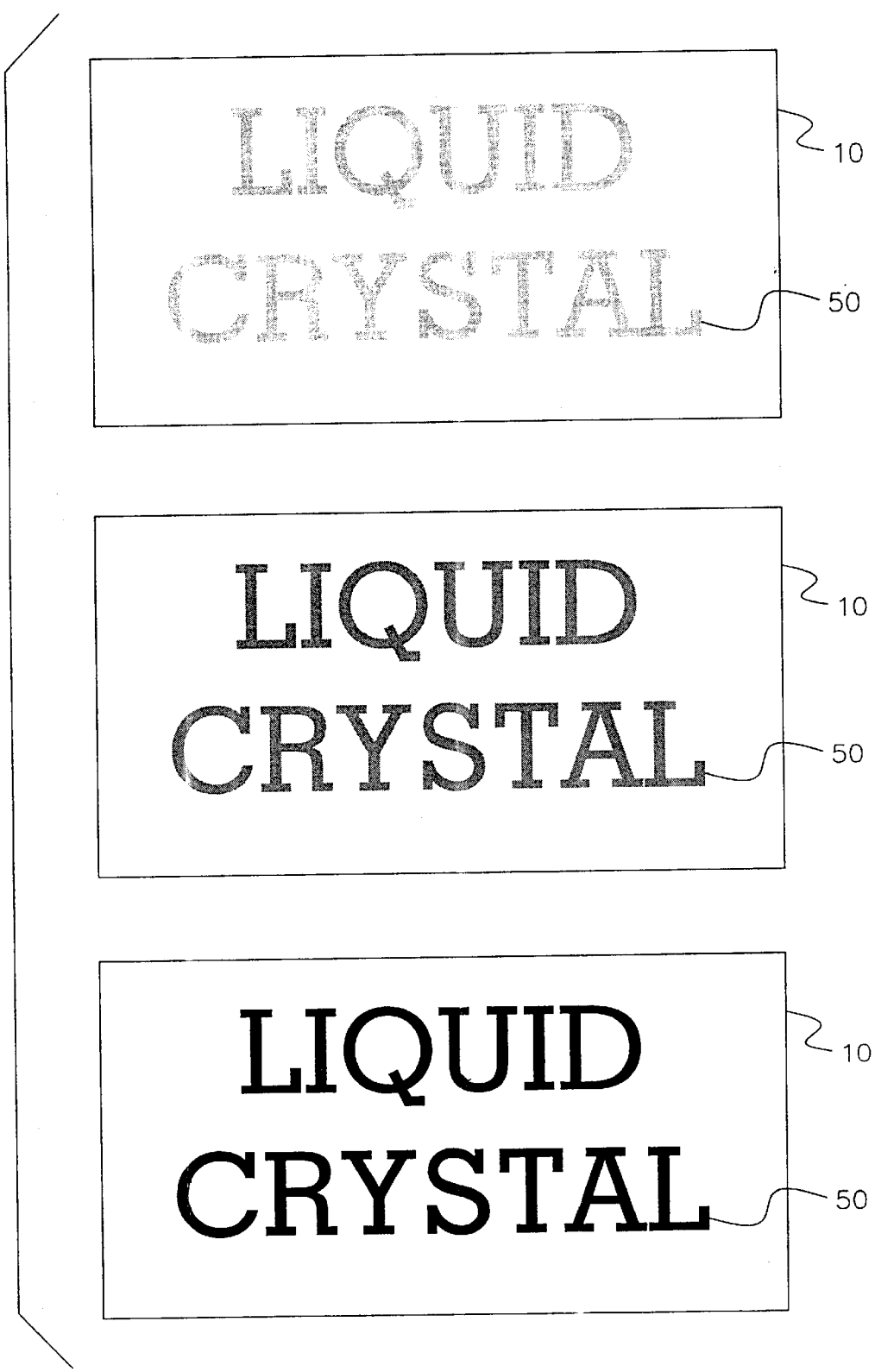
FIG. 3 depicts the visual effects of viewing text through the privacy screen having different degrees of translucence.

The domains of the dried light-modulating material had particle size varying in diameter by a ratio of 10:1. This creates large domains 32 and smaller parasitic domains 34. Parasitic domains 34 created domains have reduced optical characteristics than optimized larger domains 32. In order to compare the effectiveness of the present invention, a series of coatings according to prior art and the current invention were made. Textual information was placed the same distance from coatings according to the present invention and coatings according to the prior art. The best translucence of the present invention was greater than the prior art. FIG. 3 demonstrates an image viewed through a high translucence coating at the top, a medium translucence coating in the middle and a low translucence coating at the bottom for a given text 50.

Figure 4:
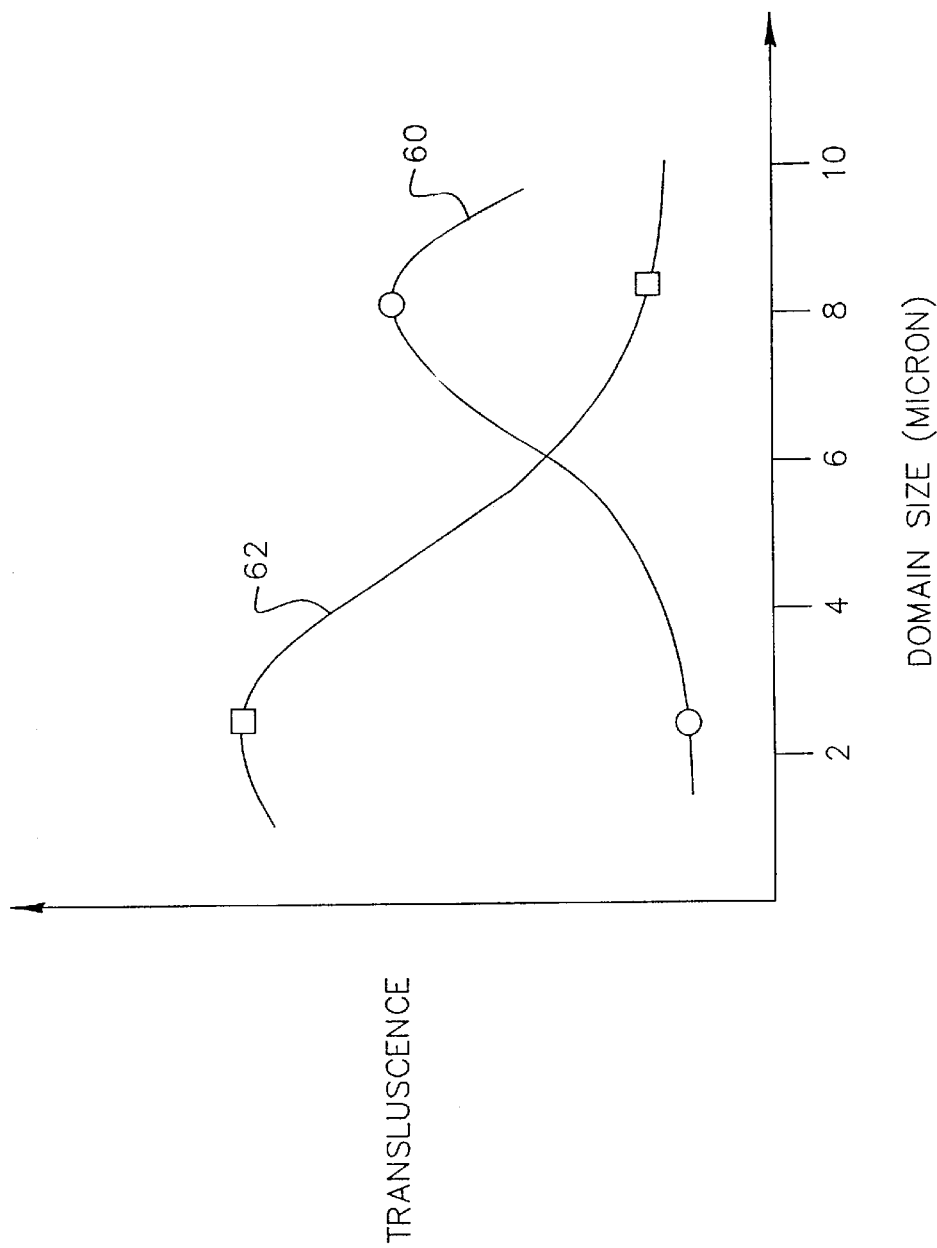
FIG. 4 is a graph of translucence vs. domain size of a nematic materials formed by conventional and limited coalescence dispersion processes.

FIG. 4 graphs conventional dispersion translucence 60 versus domain size. As domain size increases from 2 to 10 microns in size, the effective translucence of the privacy screen increases to a maximum value. Below 10 microns, domains have reduced diffusing power. The coatings lose efficiency because parasitic domains 34 are smaller than an optimal mean diameter.

Privacy screens 10 were fabricated using limited coalescence materials and processing to form uniformly sized emulsions of liquid crystalline material. This was done by homogenizing the liquid crystalline material in the presence of finely divided silica, a coalescence limiting material, (LUDOX® from duPont Corporation). A promoter material was added to the aqueous bath to drive the colloidal particles to the liquid-liquid interface. In the example, a copolymer of adipic acid and 2-(methylamino)ethanol was used as the promoting agent in the water bath. The liquid crystal material was dispersed using ultrasound to create liquid crystal domains below 1 micron in size. When the ultrasound energy was removed, the liquid crystal material coalesced into domains of uniform size. The ratio of smallest to largest domain size varied by approximately 1:2. By varying the amount of silica and copolymer relative to the liquid crystalline material, uniform domain size emulsions of average diameter (by microscopy) approximately 1, 3, and 8 micron were produced. These emulsions were diluted into gelatin solution for subsequent coating. To aid in coating of the emulsion, 0.10% sodium triisopropylnaphthalene sulfonate was added to the emulsion.

Figure 2A:
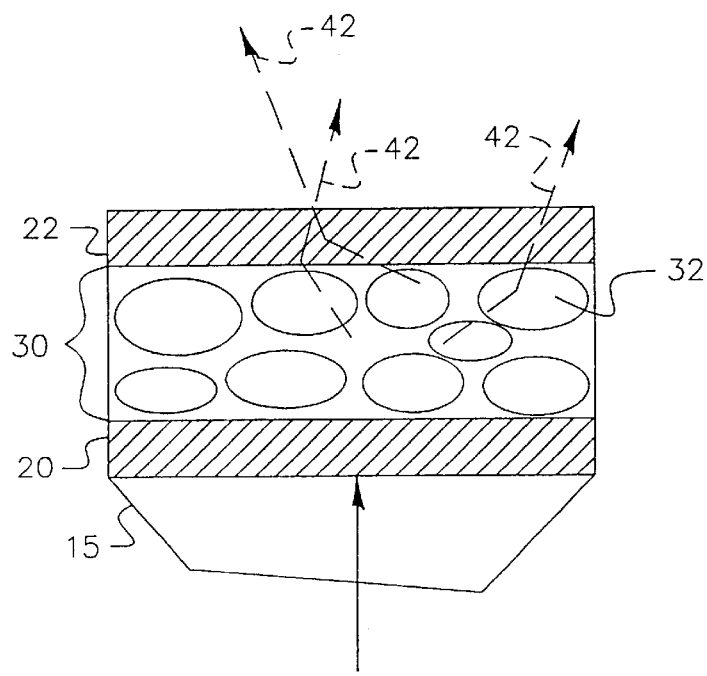
FIG. 2A is a sectional view of a privacy screen having polymer dispersed liquid crystal material using limited coalesence processes in accordance with the present invention.
Figure 2B:
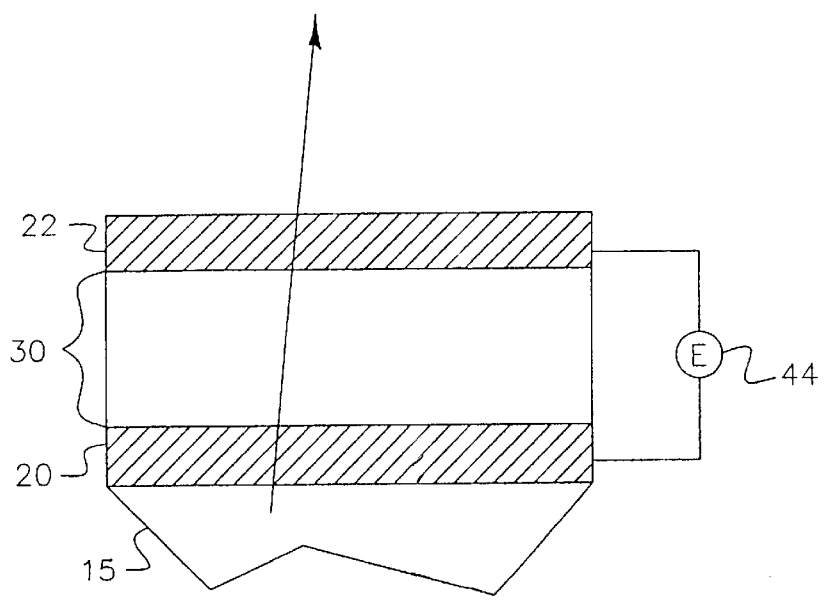
FIG. 2B is a view of the privacy screen of FIG. 2A with an applied electrical field.

The limited coalescent materials were coated using a photographic emulsion coating machine onto privacy screens of polyester having an ITO coating with a privacy screen conductivity of 160 ohms per square. The coating was dried to provide a 9 micron thick polymerically dispersed cholesteric coating. FIG. 2A is a sectional view of privacy screen 10 showing domains 32 of a limited coalescent material which have maintained their uniform size after the addition of the surfactant and after being machine coated. There were few, if any, parasitic domains 34 (having undesirable electro-optical properties) within the dried coatings. In FIG. 2B, the coated privacy screens were bonded to a second privacy screen of ITO coated plastic and electric field 44 applied to align the liquid crystal material in light-modulating layer 30. The domains aligned and all privacy screens became transparent. Therefore, the present invention provides a uniform set of domains and they are responsive to an applied electrical field to change optical states.

Limited coalescence can be viewed as dispersing a light-modulating material below a given size, and using coalescent limiting material to limit the size of the resulting domains. Such materials are characterized as having a ratio of maximum to minimum domain size of less than 2:1. By use of the term "uniform domains", it is meant that domains are formed having a domain size variation of less than 2:1. Limited domain materials have improved optical properties.

The dispersible light-modulating material(s) is provided so that such dispersible light-modulating material coalesces to form domains having at least two optical states. The first optical state is present in the absence of an electrical field. The second optical state is caused by the application of an electrical field. The arrangement is such that one of the optical states cause the light-modulating layer to be transparent, while the other optical state causes the light-modulating layer to restrict a user viewing through the privacy screen and thereby provide an appropriate level of privacy. The amount of transparency can be varied depending on the relative amount of materials that are used. The amount of restriction of light can be used also depending on the amount of materials that are used and also on the strength of the applied electrical field.

In FIG. 4, conventional dispersion translucence 60 and limited coalescence translucence 62 are plotted against domain size. Coatings made using limited coalescence having a domain size of about 2 microns had the greatest translucence. The translucence of limited coalescence generated materials dropped as domain size increased above 2 microns. For constant material concentrations and coating thickness, limited coalescent materials having a domain size of about 2 microns in size ate significantly more translucent than any sized domains formed using conventional dispersion. It has also been proven that limited coalescent dispersions can be machine coated and maintain a uniform domain size.

The invention has been described in detail with particular reference to certain preferred embodiments thereof, but it will be understood that variations and modifications can be effected within the spirit and scope of the invention.

Parts List 10 privacy screen
15 substrate
20 first conductor
22 second conductor
30 light-modulating layer
32 domains
34 parasitic domains
42 scattered light
44 electric field
50 text
60 conventional dispersion translucence
62 limited coalescence translucence

What is claimed is:

1. A method of forming an emulsion of domains in a liquid, wherein each domain includes at least one light-modulating material, the method comprising:

manipulating the at least one light-modulating material in the liquid to disperse and form a plurality of first domains of the at least one light-modulating material within the liquid, wherein, after the manipulation, the first domains coalesce to form a plurality of second domains within the liquid; and providing a colloidal material within the liquid to limit coalescence of the first domains to achieve second domains of a selected size range.

2. The method of claim 1, wherein the liquid is an aqueous liquid.

3. The method of claim 1, wherein the second domains are substantially uniform in size.

4. The method of claim 1, wherein the second domains vary in size with the ratio between the largest to smallest domain sizes being about 2:1.

5. The method of claim 1, wherein the domains include a first optical state that is present in the absence of an electrical field and a second optical state that is caused by application of an electrical field.

6. The method of claim 5, further comprising:

forming a light-modulating layer of the second domains, wherein the light-modulating layer becomes substantially transparent when one of the first and second optical states is present and the light-modulating layer substantially restricts optical viewing through the light-modulating layer when the other of the first and second optical states is present.

7. A method of forming a light-modulating, electrically responsive privacy screen comprising:

providing a substrate;

forming an electrically conductive layer over the substrate; and providing the light-modulating layer of claim 5 over the electrically conductive layer.

8. The method of claim 7, further comprising:

providing a transparent conductive layer over the light-modulating layer; and electrically coupling the conductive layers to provide an electric field to the light-modulating layer when an electrical potential is applied between the conductive layers such that the domains of the second set change optical state.

9. A product comprising:

at least one dispersible light-modulating material; and a colloidal material into which the at least one dispersible light-modulating material is provided to control coalescence of the at least one dispersible light-modulating material into a set of domains of substantially uniform size;

wherein the domains include a first optical state that is present in the absence of an electrical field and a second optical state that is caused by application of an electrical field.

10. The product of claim 9, wherein the set of domains are dispersed in a liquid.

11. The product of claim 9, wherein the domains are dispersed in a light-modulating layer.

12. The product of claim 11, wherein the light-modulating layer becomes substantially transparent when one of the first and second optical states is present and the light-modulating layer substantially restricts optical viewing through the light-modulating layer when the other of the first and second optical states is present.

* * * * *